April 3, 1956 R. A. COLLINS 2,740,379
FARROWING PEN
Filed Aug. 20, 1954 2 Sheets-Sheet 1
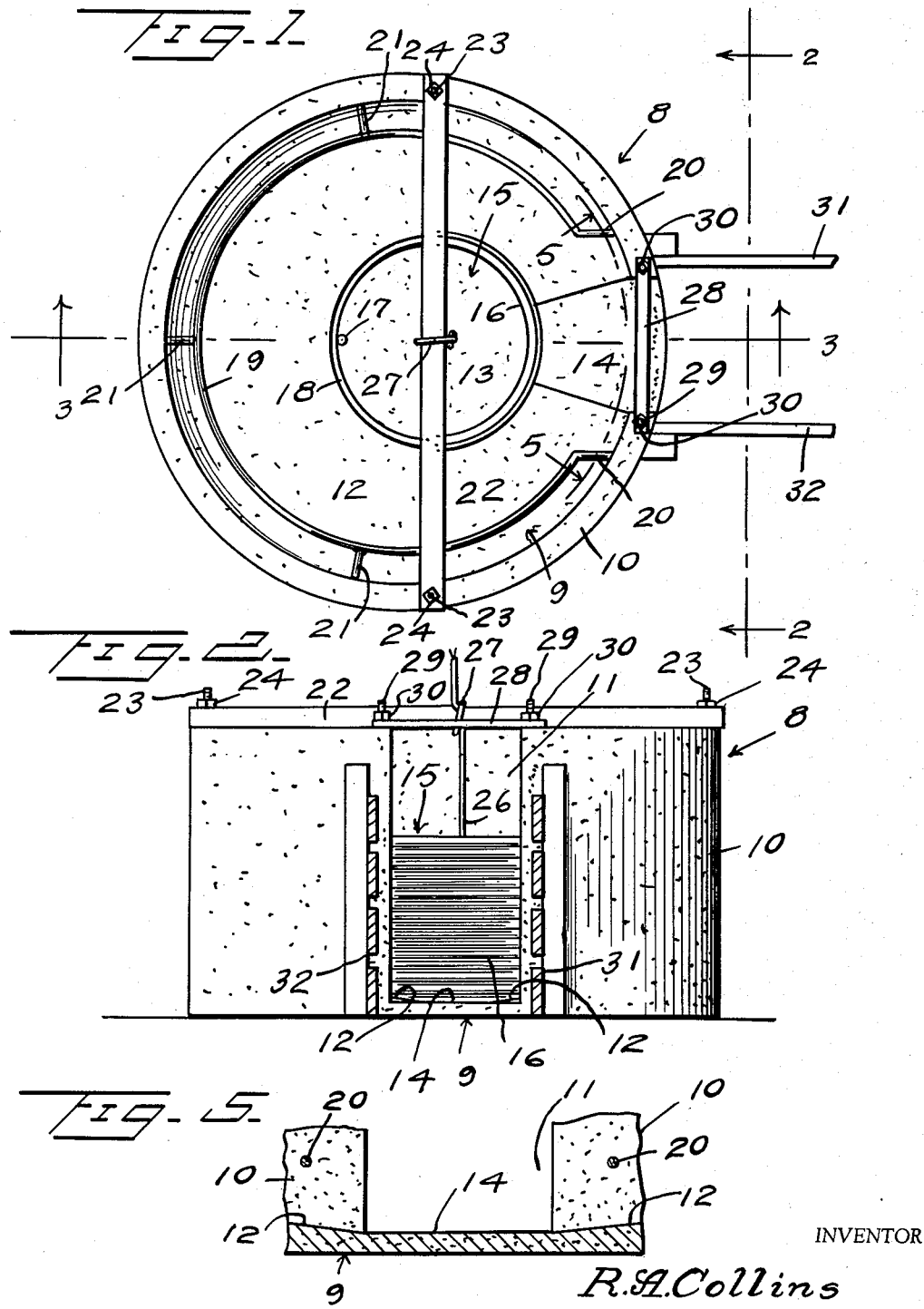
INVENTOR
R. A. Collins
BY John N. Randolph
ATTORNEY April 3, 1956 R. A. COLLINS 2,740,379
FARROWING PEN
Filed Aug. 20, 1954 2 Sheets-Sheet 2
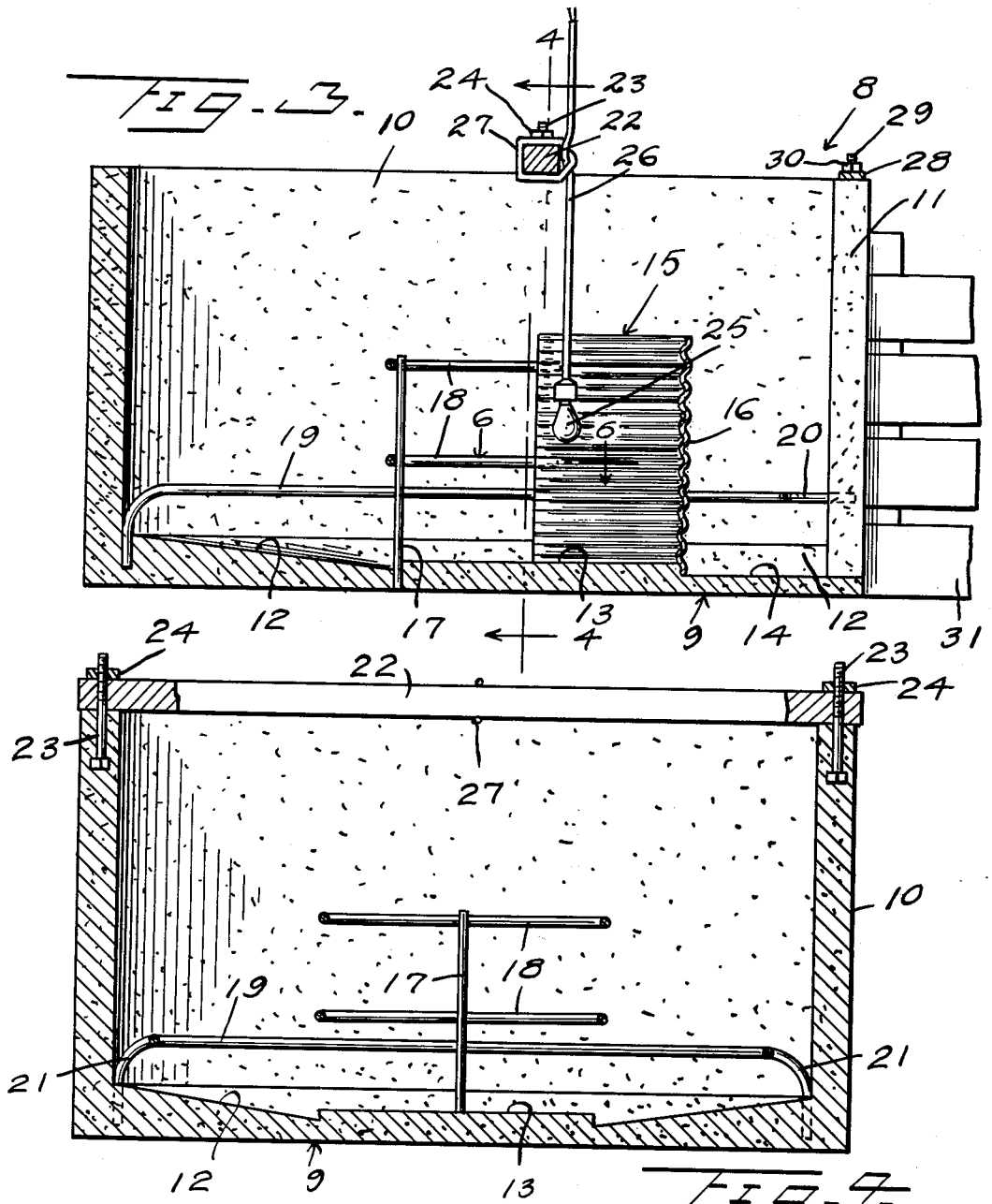
INVENTOR
R.A.Collins
BY John N. Randolph
ATTORNEY the level of the portion of the sloping floor surface 12 which is located adjacent the wall 10. Another substantially flat floor surface portion 14 extends from a portion of the flat floor surface 13 to and through the entrance opening 11. Said floor surface portion 14 is likewise flat and is preferably disposed in substantially the same horizontal plane as the part of the sloping floor surface 12 which is located immediately adjacent the floor surface 13.

2,740,379

FARROWING PEN

Robert A. Collins, Waukon, Iowa

Application August 20, 1954, Serial No. 451,113

11 Claims. (Cl. 119—20)

This invention relates to a novel pig brooder affording a protective shelter for young pigs and which is so constructed that the sow can only lie in one position within the brooder and in which position the body of the sow is disposed so that the litter of baby pigs may readily nurse.

More particularly, it is an aim of the present invention to provide a novel pig brooder or farrowing enclosure in which a litter of baby pigs will be protected from drafts or being stepped upon and crushed by a sow and including a hover structure for containing the baby pigs and from which the baby pigs can readily nurse while the sow is lying in the brooder or farrowing enclosure.

A further object of the invention is to provide a brooder or farrowing enclosure involving a novel location of the hover whereby a sow is prevented from lying down in the enclosure except in a position in which the litter of pigs can readily nurse the sow and while in the protected area afforded by the hover.

Various other objects and advantages of the invention will hereinafter become more fully apparent from the following description of the drawings, illustrating a presently preferred embodiment thereof, and wherein:

Figure 1 is a top plan view of the pig brooder or farrowing enclosure;

Figure 2 is a front elevational view thereof looking in the direction as indicated by the line 2—2 of Figure 1;

Figure 3 is a vertical sectional view on an enlarged scale, taken substantially along a plane as indicated by the line 3—3 of Figure 1;

Figure 4 is a sectional view taken at substantially a right angle to Figure 3 and along a plane as indicated by the line 4—4 of Figure 3;

Figure 5 is a fragmentary vertical sectional view taken substantially along a plane as indicated by the line 5—5 of Figure 1, and Figure 6 is an enlarged detailed fragmentary horizontal sectional view, taken substantially along a plane as indicated by the line 6—6 of Figure 3.

Referring more specifically to the drawings, the pig brooder or farrowing enclosure in its entirety and comprising the invention is designated generally 8 and includes a floor, designated generally 9, and an upstanding wall 10 which rises from the marginal portions of the floor 9 to a substantial height and which is preferably substantially circular with the exception of a gap therein forming an entrance and exit opening 11, as best illustrated in Figures 2 and 5. The floor 9 and the wall 10, constituting the enclosure, are illustrated as being formed of cement but could be formed of various other materials. For example, the wall 10 may be formed of wood or metal and the floor 9 may be formed of wood or an earthen floor may be provided.

The upper surface of the floor 9 as seen at 12 slopes downwardly and inwardly from the wall 10 toward a substantially flat floor surface 13 which is disposed at a slightly higher elevation than the part of the floor surface 12, disposed immediately adjacent thereto, but below the level of the portion of the sloping floor surface 12 which is located adjacent the wall 10. Another substantially flat floor surface portion 14 extends from a portion of the flat floor surface 13 to and through the entrance opening 11. Said floor surface portion 14 is likewise flat and is preferably disposed in substantially the same horizontal plane as the part of the sloping floor surface 12 which is located immediately adjacent the floor surface 13.

As best seen in Figures 1 and 3, the floor surface 13 is offset relatively to the center of the enclosure 8, 9 in a direction toward the entrance and exit opening 11. Said floor surface 13 constitutes a hover floor which hover, designated generally 15, additionally includes a substantially semicircular vertical hover wall 16. The remainder of the hover is formed by a guard portion of openwork construction including an upright rod forming a post 17 having a lower end anchored in and rising from the floor 9 adjacent an edge portion of the floor surface 13, and which post 17 is preferably spaced substantially equal distances from the ends of the wall 16. Two or more arcuately bowed rods 18 have intermediate portions secured to vertically spaced parts of the post 17 and end portions overlying and suitably secured to the ends of the wall 16. The rods 18 combine with the post 17 to form an openwork half of the wall of the hover 15 constituting a guard or shield and which is located remote from the entrance and exit opening 11. The solid wall portion 16 has its lower edge suitably secured to a part of the floor 9, around a part of the floor surface 13 and is disposed adjacent said entrance and exit opening 11, as best illustrated in Figures 1, 2 and 3. The wall 16 is illustrated as being formed of corrugated metal but may be formed of concrete, wood or any other suitable material.

A guard rail 19 extends around the inner side of the wall 10 and is spaced inwardly a short distance therefrom and is disposed approximately the same distance above a part of the sloping floor surface 12. The ends of the guard rail 19, as illustrated in Figures 1 and 3, and designated 20, may be turned outwardly and anchored in the wall 10 adjacent the opening 11. The guard rail 19 is supported at a plurality of points spaced from its ends by brace members 21 which are anchored in the floor 9 and extend upwardly therefrom adjacent the wall 10 and are curved inwardly. The curved brackets 21 afford clearance under the guard rail for young suckling pigs.

A rigid cross member 22 may extend across a top portion of the enclosure 9, 10 and if desired, may be secured thereon by threaded bolts or studs 23 which are anchored in the wall 10 and which rise therefrom and extend through the cross member 22. Nuts 24 may engage the upper ends of the studs 23 for securing the cross member 22 thereto, and so that an intermediate part of the cross member will be disposed over the hover 15, as illustrated in Figure 1. The cross member 22 provides a support for a heat lamp 25 or any other suitable electrical heating means which is suspended from an electric cord 26, a part of which is looped around and thus anchored to the cross member 22, as best seen in Figure 3, at 27. Where the enclosure 8 is disposed within another roofed enclosure or building, not shown, the cross member 22 may be omitted and the electric cord 26 may be suspended from a ceiling or roof portion of such building.

A crossbar 28 spans the top of the opening 11 and rests upon the upper edges of the ends of the wall 10 and may be secured thereto by threaded bolts or studs 29 which are anchored in and extend upwardly from the wall 10 and by nuts 30 which engage said bolts and bear on the ends of the crossbar 28, through which the studs 29 extend. The crossbar 28 may function to support a curtain closure, not shown, for the opening 11 and may be omitted where such a closure is not required.

Portions of the sides 31 and 32 of a runway are shown extending from the wall 10 on opposite sides of the opening 11. However, such a runway may be omitted and constitutes no part of the present invention.

From the foregoing it will be readily apparent that a litter of young suckling pigs may be readily accommodated within the hover 15 and such young pigs, not shown, will tend to gravitate down the floor surface 12 toward the hover floor 13. It will also be apparent that the young suckling pigs while within the hover 15 will be protected from being stepped on and crushed or otherwise injured by a sow and will also be shielded from drafts entering the enclosure 8 through the opening 11. Additionally, the heating means 25 may be located at any desired level above the hover floor 13 for warming the pigs within the hover.

The enclosure is of sufficient size so that adequate space exists between the hover 15 and wall 10 to enable a sow to enter the enclosure through the opening 11 or to leave the enclosure by said opening. A sow may readily pass around the enclosure between the hover and the wall 10. However, the substantially circular shape of the wall 10 and its proximity to the solid hover wall section 16 adjacent the opening 11, will prevent a sow from conveniently lying down between the hover wall section 16 and said enclosure wall 10. On the other hand, adequate space is afforded for a sow to lie down on the surface 12 between the enclosure wall 10 and the openwork hover guard portion 17, 18. However, due to the shape of the wall 10 and its proximity to the guard portion 17, 18, a sow can only lie down with her back to the wall 10 and guard rail 19 so that her belly will be disposed adjacent the openwork hover portion 17, 18, in which position the suckling pigs within the hover 15 may readily nurse the sow without risk of injury should the sow suddenly stand up and likewise without risk of being injured by the sow as she lies down.

It will thus be apparent that a pig brooder or farrowing enclosure 8 of novel construction has been provided in which suckling pigs will be adequately protected within a protected area formed by hover 15, and which enclosure is so constructed that a sow may only conveniently lie therein in a position such that the suckling pigs within the hover may readily nurse from the sow. Additionally, any drainage over the floor surface 12 will be around the hover floor 13 and outwardly over the floor surface 14 through the enclosure opening 11.

Various modifications and changes are contemplated and may obviously be resorted to, without departing from the spirit or scope of the invention as hereinafter defined by the appended claims.

I claim as my invention:

1. A pig brooder comprising a floor, an outer enclosure wall extending upwardly from said floor and having an entrance and exit opening formed in a part thereof and extending downwardly to the floor, said outer wall being substantially circular, and a substantially circular hover disposed within the enclosure and spaced from said outer wall and adapted to contain a litter of pigs, said hover including a segmental wall portion and a segmental section of openwork construction forming a guard portion spaced a distance from an adjacent part of said outer wall such that a sow may conveniently lie on the floor between said outer wall and the guard portion of the hover only with her back toward the outer wall and with her belly adjacent the openwork guard portion of the hover.

2. A pig brooder as in claim 1, said hover being eccentrically disposed within the enclosure defined by said outer wall and being disposed with its center nearer the entrance and exit opening than the part of the outer wall located opposite said wall opening, the hover being spaced from said outer wall a sufficient distance to permit a sow to readily pass through the wall opening and around the hover.

3. A pig brooder as in claim 2, said hover wall portion being solid and being disposed adjacent the outer wall opening.

4. A pig brooder as in claim 3, said solid hover wall portion and the openwork guard portion of the hover each being substantially of semicylindrical shape.

5. A pig brooder as in claim 4, heating means disposed within the hover and above the hover floor, and means for suspending said heating means from above the hover.

6. A hover as in claim 1, said floor sloping downwardly and inwardly from said outer wall to the hover, a portion of said floor, constituting the hover floor, being disposed above the level of the sloping floor portion disposed immediately therearound and below the level of the sloping floor portion disposed adjacent said outer wall.

7. A pig brooder as in claim 6, said floor including a substantially flat portion, disposed below the level of the hover floor and extending from the hover to and through said outer wall opening, the inner lower part of said sloping floor portion being disposed at the same level or above the level of the flat floor portion.

8. A pig brooder as in claim 7, and a guard rail extending around the sloping floor portion and disposed above and adjacent thereto and inwardly of and adjacent said outer wall.

9. A farrowing enclosure including a floor, an upstanding substantially cylindrical wall rising from said floor and provided with an entrance and exit opening in a part thereof extending upwardly from the floor, and a cylindrical hover disposed within said enclosure eccentrically with respect to said cylindrical wall and having its center disposed nearer said wall opening than the wall portion disposed opposite to said opening, said hover including a segment of openwork construction.

10. A farrowing enclosure as in claim 9, said hover having a solid substantially semicylindrical wall portion located adjacent said opening.

11. A farrowing enclosure as in claim 10, said floor sloping downwardly and inwardly from said cylindrical wall toward the hover and including a hover floor portion disposed above the level of the adjacent part of the sloping floor portion and below the level of the remote part of said sloping floor portion.

References Cited in the file of this patent

UNITED STATES PATENTS

| | | |
|---|---|---|
| 700,949 | Klindworth | May 27, 1902 |
| 1,309,071 | Johnson | July 8, 1919 |
| 2,530,485 | Shannon | Nov. 21, 1950 |